United States Patent [19]

Kusagaya

[11] Patent Number: 5,580,149
[45] Date of Patent: Dec. 3, 1996

[54] AUTOMOTIVE HEADLAMP

[75] Inventor: Masahiro Kusagaya, Shizuoka, Japan

[73] Assignee: Koito Manufacturing Co., Ltd., Tokyo, Japan

[21] Appl. No.: 498,748

[22] Filed: Jul. 6, 1995

[30] Foreign Application Priority Data

Jul. 25, 1994 [JP] Japan .................................. 6-192263
Mar. 28, 1995 [JP] Japan .................................. 7-093250

[51] Int. Cl.$^6$ .................................................... B60Q 1/068
[52] U.S. Cl. .......................... 362/66; 362/273; 362/289; 74/417
[58] Field of Search ........................... 74/502.1, 89.13, 74/89.14, 89.15, 417; 362/61, 66, 69, 273, 289, 421–425

[56] References Cited

U.S. PATENT DOCUMENTS

| | | | |
|---|---|---|---|
| 4,689,725 | 10/1987 | Saijo et al. | 362/66 |
| 4,761,717 | 8/1988 | McMahan et al. | 362/66 |
| 4,881,152 | 11/1989 | Watanabe et al. | 362/66 |
| 4,916,587 | 4/1990 | Hirose et al. | 362/66 |
| 4,930,367 | 6/1990 | Nagasawa | 74/416 |
| 5,258,894 | 11/1993 | Bivens | 362/66 |
| 5,260,857 | 11/1993 | Lukkarinen et al. | 362/66 |
| 5,365,415 | 11/1994 | Schmitt et al. | 362/66 |
| 5,444,603 | 8/1995 | Otsuka et al. | 362/66 |

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

An automotive headlamp including a gear apparatus having a cylindrical gear shaft supporting wall extending from an opening edge of a shaft insertion hole formed in a supporting wall of a lamp housing, the gear shaft supporting wall being formed on an edge surface thereof with slits or protrusions, a gear shaft having a gear part which is provided at a surface thereof facing the edge surface of the gear shaft supporting wall with projections or slits which engage with the slits or projections of the gear shaft supporting wall, the gear shaft further including an engagement groove formed on an outer peripheral surface of a portion in the vicinity of the other end thereof, and a fastener engaging with the engagement groove for holding the gear shaft in position when it is inserted into the gear shaft supporting wall and the shaft insertion hole. The fastener is provided with resilient pieces extending outward from an outer peripheral edge thereof. The resilient pieces incline toward the supporting wall side and resiliently abut against the supporting wall. During operation, the resilient pieces are deformed to thereby disengage the protrusions or slits of the gear shaft from the slits or protrusions of the gear shaft supporting wall.

19 Claims, 6 Drawing Sheets

AUTOMOTIVE HEADLAMP

BACKGROUND OF THE INVENTION

1. Field of the Invention

The present invention relates to a novel automotive headlamp. More particularly, the invention relates to an automotive headlamp having a gear apparatus for an aiming mechanism or the like, in which gear apparatus a gear shaft hardly rotates with respect to a gear shaft supporting wall while the gear shaft is in a non-rotation state, whereas, in contrast, the gear shaft is allowed to rotate smoothly while the gear shaft is in a rotation state.

2. Related Art

A conventional automotive headlamp having the gear apparatus is, for example, employed as a part of an aiming mechanism in which a tip end portion of an aiming screw unrotatably engages with a headlamp unit through a receiving member, and a first gear threadably mounted on a threaded shaft part of the aiming screw engages with a second gear linked to an operation shaft.

When the second gear is rotated by operating the operation shaft, the first gear engaging with the second gear starts to rotate. Since the aiming screw is unrotatable the threaded shaft part of which is urged to move back or forth so that the aiming screw moves in an axial direction thereof. Therefore, a position of a portion of the headlamp unit where the receiving member is supported varies to tilt the headlamp unit.

In the conventional mechanism, a load is applied against a rotational force of the gear in order to prevent the gear from rotating during non-operation condition of the operation shaft due to an external vibration such as a vibration generated while the automobile is travelling.

According to an automotive headlamp having the conventional gear apparatus as described above, since a load is applied against a rotational force of the gear, a relatively strong operational force is required for operating the operation shaft. Therefore, it may be difficult to operate the gear is not. On the other hand, if the load applied against the rotational force of the gear is lowered to make it easier to operate the gear, the gear may be readily rotated due to an external vibration applied to the gear.

SUMMARY OF THE INVENTION

The present invention was made in view of the foregoing difficulty accompanying the conventional gear apparatus for an automobile.

Therefore, an object of the present invention is to provide an automotive headlamp employing a gear apparatus capable of improving operation of the gear apparatus.

Another object of the present invention is to provide an automotive headlamp employing a gear apparatus capable of improving a workability of the gear apparatus during assembly thereof.

The above and other objects can be achieved by an automotive headlamp which, according to the present invention, includes a gear apparatus having a cylindrical gear shaft supporting wall extending from an opening edge of a shaft insertion hole formed in a supporting wall of a lamp housing, the gear shaft supporting wall being formed on an edge surface thereof with slits or protrusions, a gear shaft having a gear part which is provided at a surface thereof facing the edge surface of the gear shaft supporting wall with projections or slits which engage with the slits or projections of the gear shaft supporting wall, the gear shaft further including engagement grooves formed on an outer peripheral surface of a portion in the vicinity of the other end thereof, and a fastener engaging with the engagement grooves for preventing the gear shaft from removing while inserted into the gear shaft supporting wall and the shaft insertion hole. The fastener is provided with resilient pieces extending outward from an outer peripheral edge thereof. The resilient pieces incline toward the supporting wall side and resiliently abut against the supporting wall. In operation, the resilient pieces are deformed to thereby disengage the protrusions or slits of the gear shaft from the slits or protrusions of the gear shaft supporting wall.

According to the automotive headlamp of the present invention, while the gear shaft does not rotate, a resilient force directed toward the end surface of the gear shaft supporting wall is applied to the protrusions or slits formed on the gear shaft by the resilient pieces formed on the fastener which resiliently abuts against the supporting wall, so that the protrusions or slits of the gear shaft engage with the slits or protrusions formed on the end surface of the gear shaft supporting wall to thereby suppress the rotation of the gear shaft. Therefore, the gear shaft is held on the gear shaft supporting wall which hardly rotates. In contrast, while the gear shaft rotates, the resilient pieces are provided so as to be deformed, and the protrusions or slits formed on the gear shaft can be moved in a direction opposed to the end surface of the gear shaft supporting wall, so that the protrusions or slits of the gear shaft easily disengage from the slits or protrusions of the gear shaft supporting wall to thereby allow the gear shaft to rotate smoothly. Owing to this structure, even if an external vibration, for example, is applied to the gear shaft or the like, the gear shaft never tends to rotate, although the gear shaft can rotate easily when necessary.

In the invention, the diameter of the gear shaft is designed slightly larger than the inner diameter of the fastener. However, if the faster is to engage with the engagement groove of the gear shaft, the inner diameter of the fastener can be substantially enlarged thereby to easily engage with the gear shaft because of the radially extending slits formed on the inner peripheral surface of the fastener. When the gear shaft completely engages with the fastener, the enlarged inner diameter of the faster is recovered to original condition, and the stable engagement can be attained. Owing to this structure, good workability during assembly of the fastener to the gear shaft can be obtained.

Further, since the outward projecting pieces are provided on the outer peripheral surface of the fastener at positions corresponding to the portions of the fastener where the slits are formed, a sufficient distance or gap can be held between an outer end of the slits and an outer edge of the fastener. Therefore, a sufficient mechanical strength of the fastener can be maintained which prevents the fastener from being damaged or broken.

DESCRIPTION OF THE PREFERRED EMBODIMENTS

Figure 1:
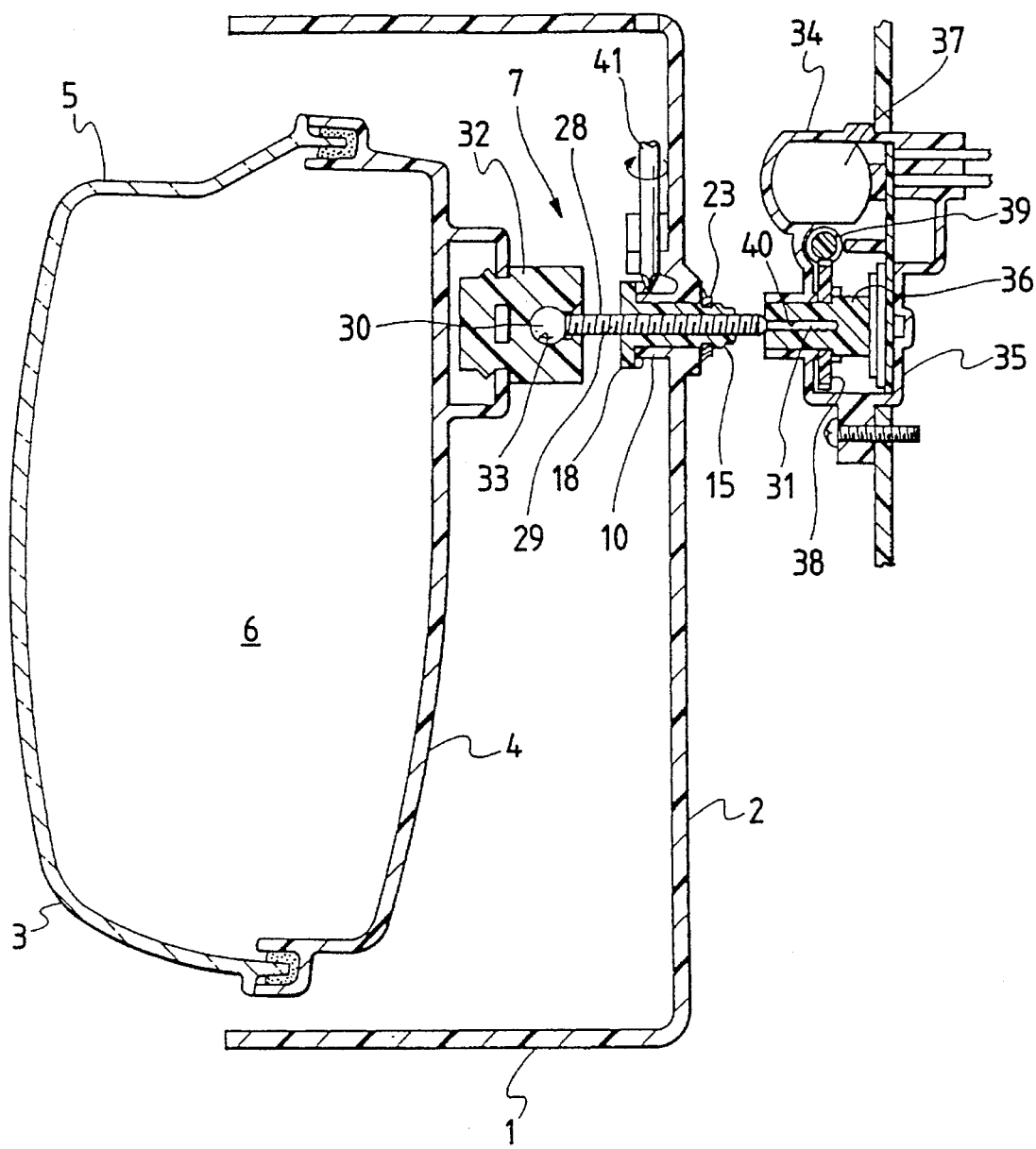
FIG. 1 is a schematic sectional view of an automotive headlamp according to one embodiment of the present invention.
Figure 2:
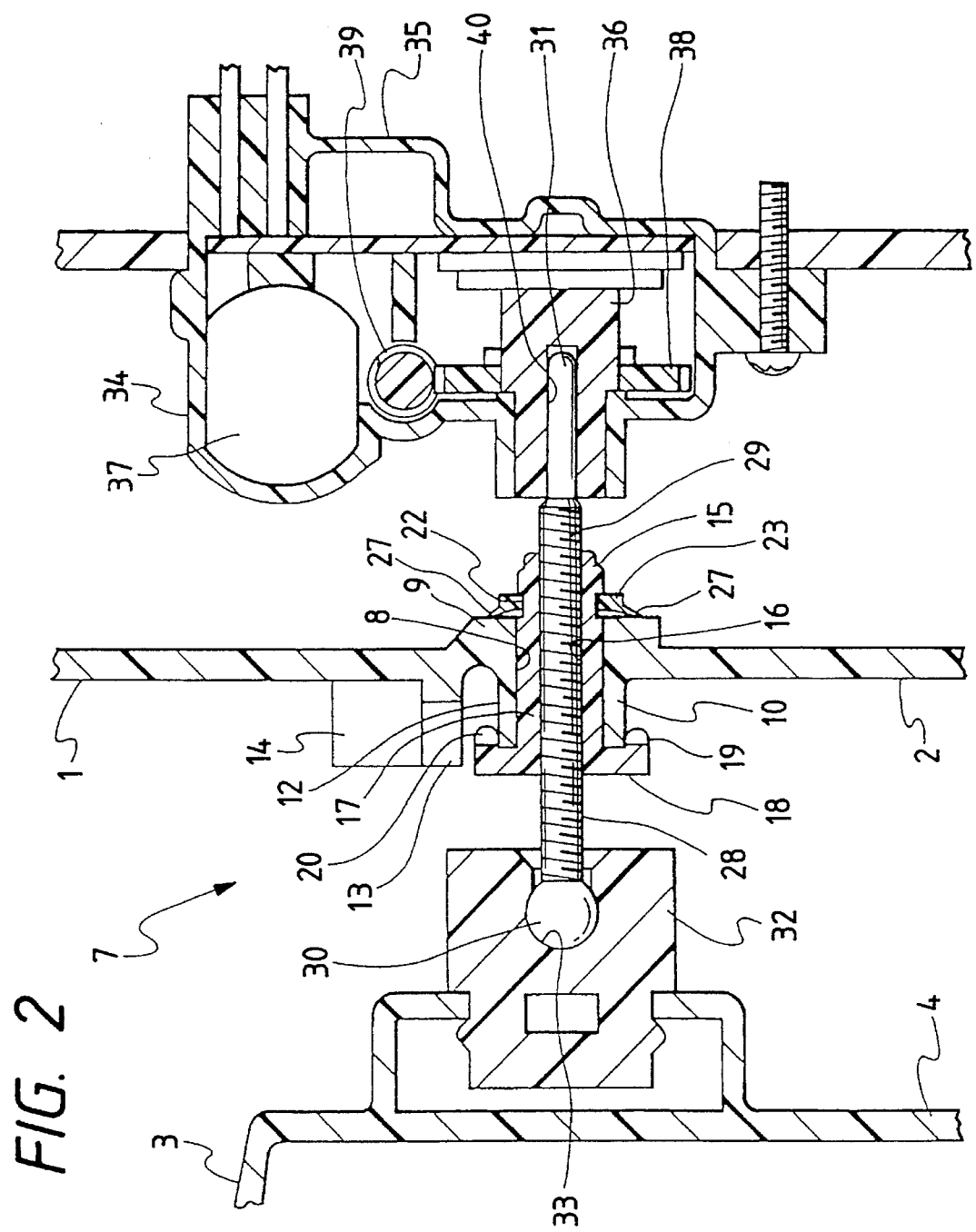
FIG. 2 is an enlarged sectional view showing an essential part of the automotive headlamp shown in FIG. 1.

A preferred embodiment of an automotive headlamp according to the present invention will now be described in detail with reference to the accompanying drawing FIGS. 1 through 5.

A lamp housing 1 fixed to a vehicle body of an automobile now shown has a back wall 2. A lamp unit 3 is constituted by a lamp body 4, a lens 5 covering a front opening of the lamp body 4 and a bulb serving as a light source disposed within a chamber 6 defined by the lamp body 4 and the lens 5. The headlamp unit 3 is tiltably supported within the lamp housing 1 by one rotational fulcrum member and a couple of gap adjusting members. With this structure, when a gap between the lamp housing at a position of one of the gap adjusting members and the headlamp unit 3 is changed, the headlamp unit 3 is tilted around a line connecting between the other gap adjusting member and the rotational fulcrum member, which line performs as a rotational axis. The present invention is applied to a part of the gap adjusting member.

Figure 3:
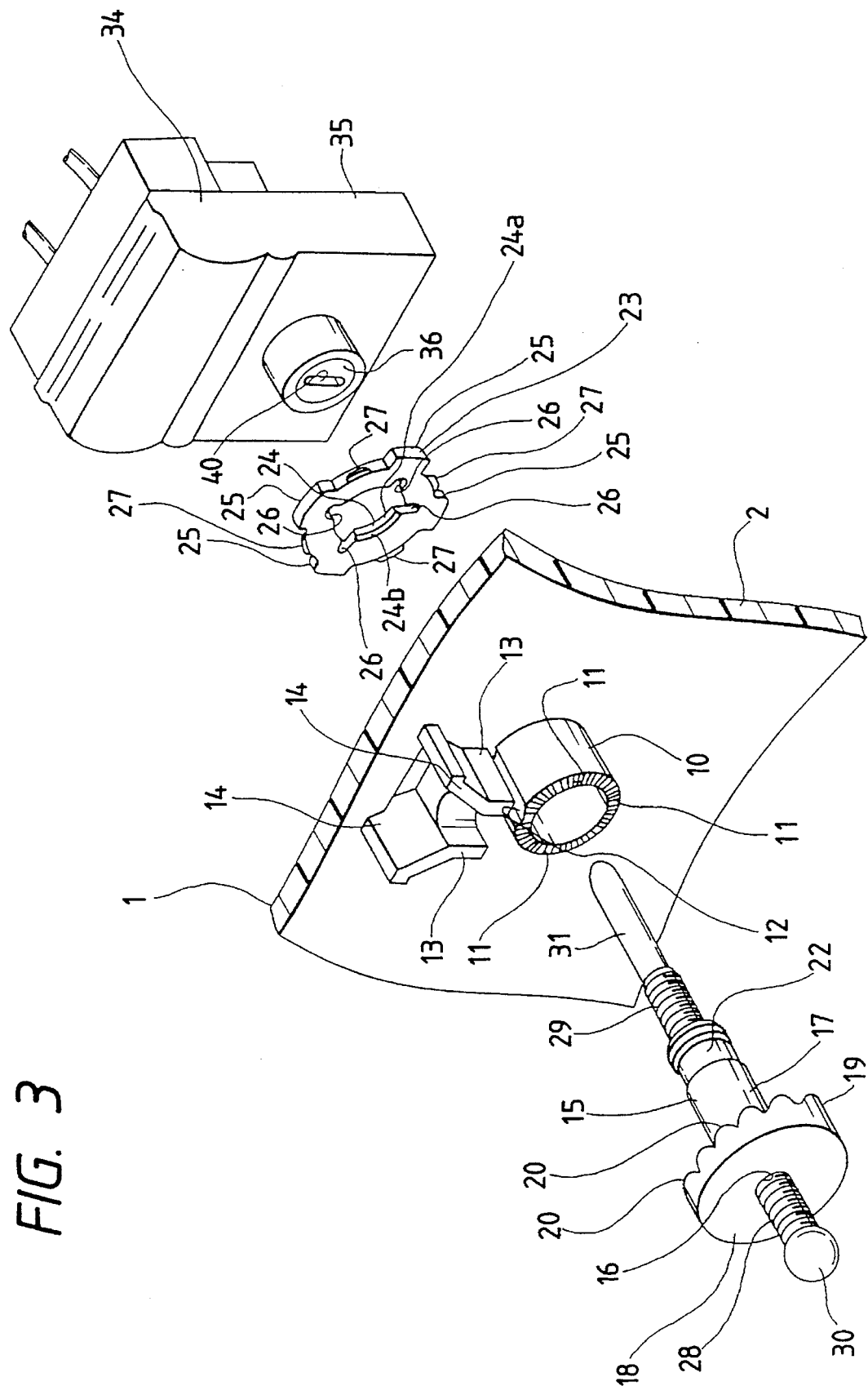
FIG. 3 is an enlarged perspective view showing an essential part of the automotive headlamp shown in FIG. 1.

The gap adjusting member 7 is provided with a shaft insertion hole 8 formed in the back wall 2 of the lamp housing 1, through which a gear shaft described hereinbelow is inserted. A shaft holding wall 9 formed on the back wall 2 extends backward from an opening edge of the shaft insertion hole 8 and a cylindrical gear shaft supporting wall 10 extends frontward therefrom. As shown in FIG. 3, shallow slits 11 are formed on a front edge surface of the gear shaft supporting wall 10, and a recess portion 12 is formed on an upper end part of an outer periphery of the gear shaft supporting wall 10, which is V-shaped having a flat bottom as viewed from the rear side.

A pair of driver supporting walls 13, 13 project from a front surface of the back wall 2 in the vicinity of a top of the gear shaft supporting wall 10 and extend vertically. A space defined by the driver supporting walls 13, 13 directs to the top part of the gear shaft supporting wall 10 and particularly to the recess portion 12 thereof. Further, a pair of driver guide walls 14, 14 continuously extend from an upper end of the driver supporting walls 13, 13. The driver guide walls 14, 14 incline in such a manner that this upper parts diverge.

Figure 4:
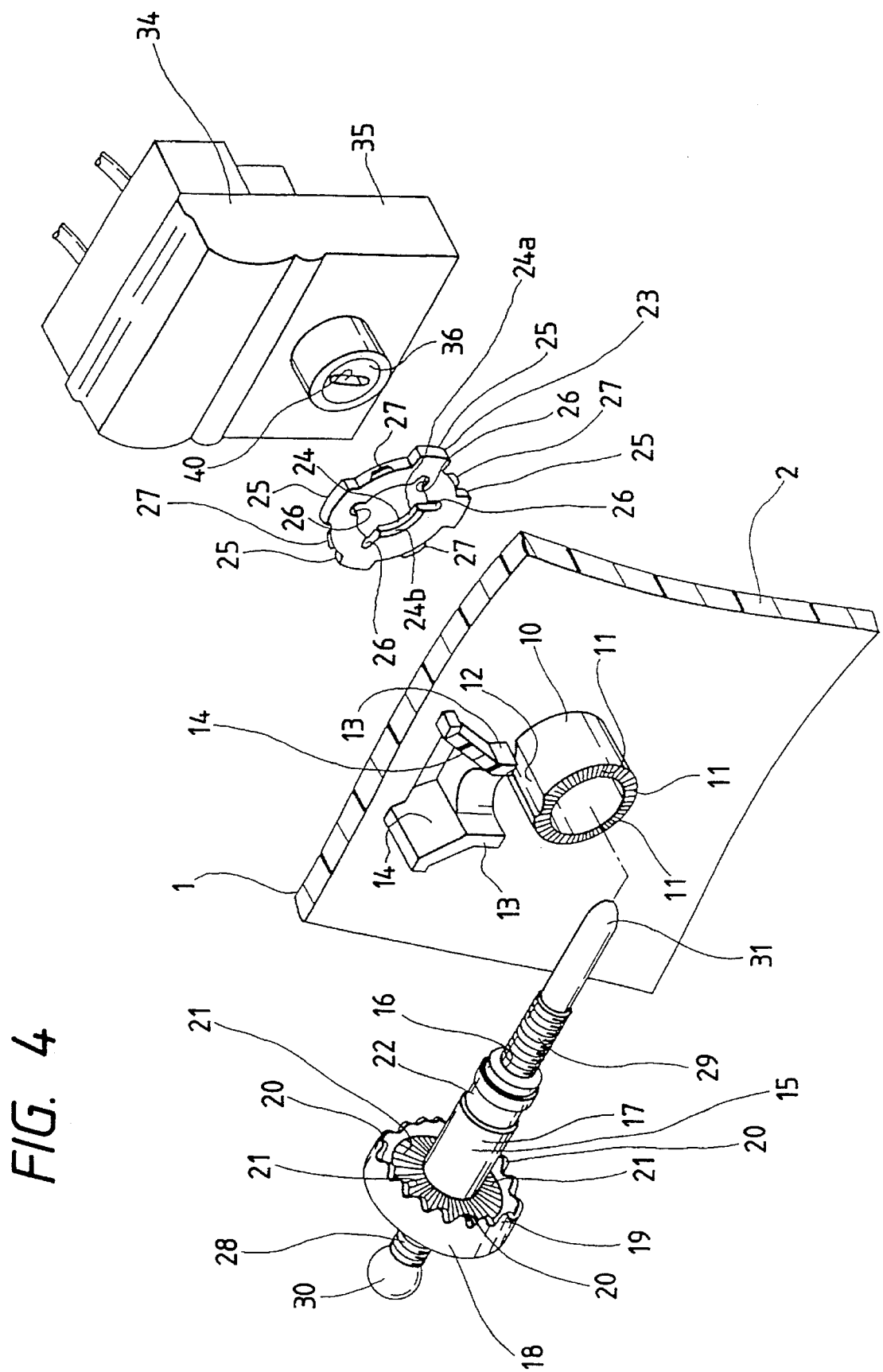
FIG. 4 is an enlarged perspective view showing an essential part of the automotive headlamp shown in FIG. 1, which is partially cut out.
Figure 5:
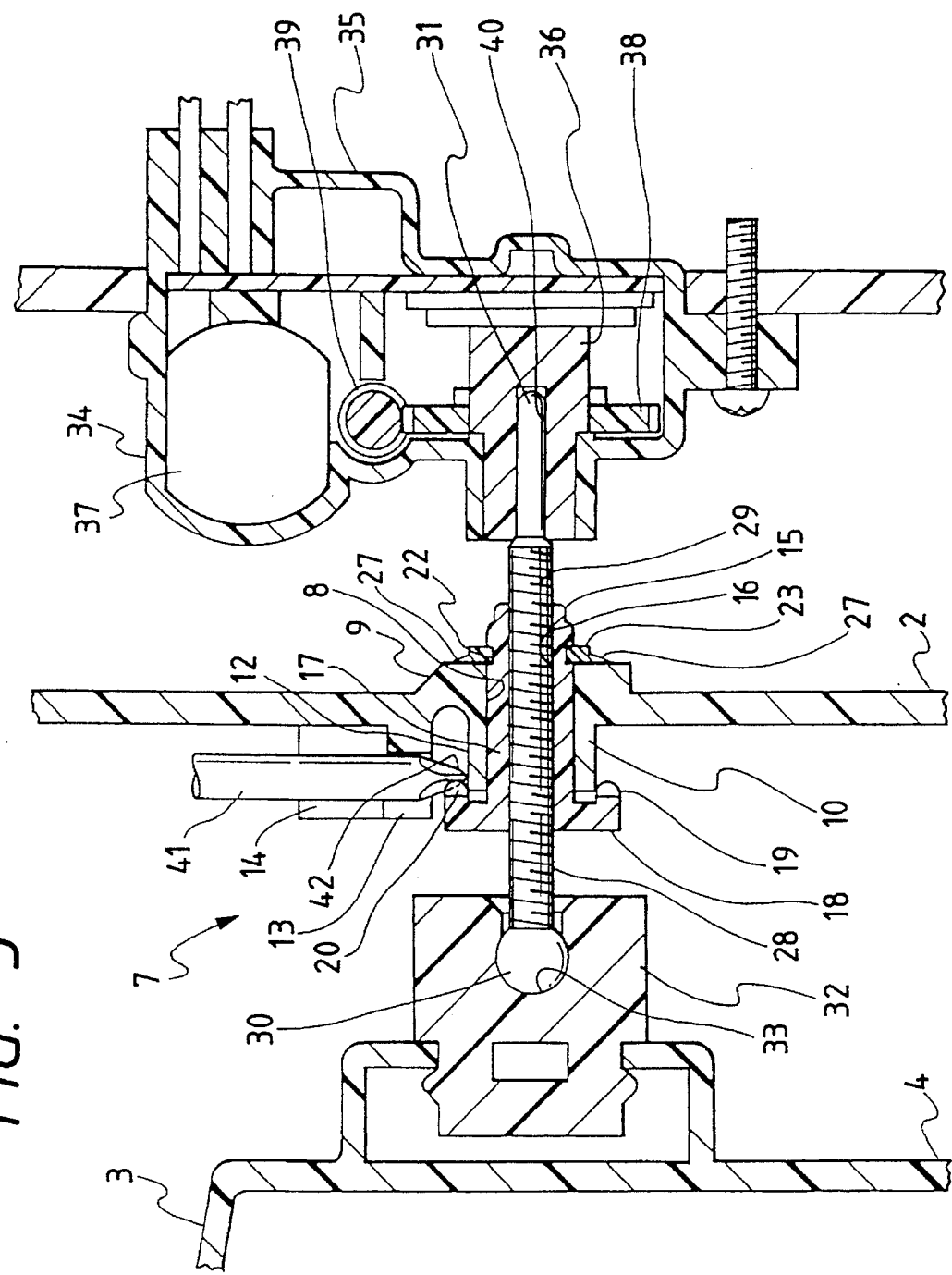
FIG. 5 is an enlarged sectional view of an essential part of the automotive headlamp for explaining an aiming adjustment operation.

A gear shaft 15 is integrally constituted by a main part 17 having a substantially cylindrical threaded hole 16 and a crown gear part 18 projecting outward from a front end of the main part 17. The crown gear part 18 is provided with a gear forming edge 19 protruding from a peripheral edge of a plane facing the back wall 2 of the lamp housing 1, and gear teeth 20 are formed on a rear surface of the gear forming edge 19. As shown in FIG. 4, protrusions 21, 21 . . . extending radially are formed on a rear surface of the crown gear part 18 inside the gear forming edge 19. The main part 17 of the gear shaft 15 is formed with an engagement groove 22 annularly which extends on a rear end portion of an outer peripheral surface of the shaft.

As shown in FIGS. 3 and 4, a substantially annular fastener 23 made of a synthetic resin such as nylon 66 is provided with a mounting hole 24 at a center part thereof.

The mounting hole 24 includes a rear half part 24a having the same diameter and a front half part 24b having a diameter which is spread frontward. The inner diameter of the rear half part 24a is substantially equal to an outer diameter of the engagement groove 22 of the gear shaft 15, whereas the largest inner diameter of the front half part 24b is substantially equal to or slightly larger than an outer diameter of the main part 17 of the gear shaft 15.

The fastener 23 is provided with four projecting pieces 25, 25 . . . extending outward formed on an outer periphery thereof at four positions spaced apart from one another by equal intervals. Slits 26, 26 . . . extending radially are formed in an inner peripheral surface of the fastener 23 at positions corresponding to the projecting pieces 25. A bottom of each slit is semicircular as viewed along an axial direction thereof. Resilient pieces 27, 27 . . . extending outward are formed on an outer periphery of the fastener 23 at positions between the projecting pieces 25. The resilient pieces 27 slightly incline frontward at a tip end thereof.

The main part 17 of the gear shaft 15 is inserted from the front side of the back wall 2 of the lamp housing 1 through the gear shaft supporting wall 10, shaft insertion hole 8 and shaft holding wall 9 in this order, so that the engagement groove 22 of the gear shaft 15 is positioned just rear of the rear edge of the shaft holding wall 9. After that, the fastener 23 is mounted on the gear shaft 15 from a rear side thereof and comes into engagement with the engagement groove 22 of the shaft 15. When some portions of the gear shaft 15 pass through the mounting hole 24, the inner periphery of the fastener 23 is deformed frontward thereby to enlarge the inner diameter because the four slits 26, 26 . . . are formed in the inner periphery of the fastener 23, so that the portion can be fit on the engagement groove 22.

When the fastener 23 engages with the engagement groove 22 of the gear shaft 15, the resilient pieces 27, 27 . . . resiliently abut against the rear surface of the shaft holding wall 9 of the lamp housing 1. In this way, the gear shaft 15 is rotatably supported by the back wall 2 of the lamp housing 1. The support of the gear shaft 15 is accomplished not only by the shaft insertion hole 8 but also the shaft holding wall 9 and the gear shaft supporting wall 10. Accordingly, extremely stable support can be achieved.

The gear shaft 15 is urged rearward by the resilient pieces 27, 27 . . . of the fastener 23 resiliently abutting against the rear surface of the shaft holding wall 9, so that the protrusions 21, 21 . . . formed on the rear surface of the rear surface of the crown gear part 18 engage with the shallow slits 11 formed on the front edge surface of the gear shaft supporting wall 10 thereby to click-stop the gear shaft 15 at a certain position in the rotational direction thereof.

An aiming screw 28 is integrally constituted by a main threaded shaft part 29, a ball part 30 formed at a front end of the threaded shaft part 29, and a slide shaft part 31 continuously formed at a rear end of the threaded shaft part 29. The slide shaft part 31 is flat rectangular in cross section. The threaded shaft part 29 of the aiming screw 28 engages with the threaded hole 16 of the main part 17 of the gear shaft 15.

A ball receiving member 32 formed of synthetic resin is supported by the lamp body 4 of the headlamp unit 3 and provided with a spherical concave part 33 having a rear opening. The ball part 30 of the aiming screw 28 is fitted in the spherical concave part 33 of the ball receiving member 32. In this condition, the aiming screw 28 is tiltably and rotatably coupled to the ball receiving member 32, and therefore also the headlamp unit 3.

A leveling drive member 34 is of a swivel type, which is moved in the axial direction of the aiming screw 28 by rotating the screw. A casing for the leveling drive member 34 is secured onto the automobile body at a rear portion of the back wall 2 of the lamp housing 1. A drive shaft 36 having a front end surface exposing frontward from a front surface of the casing is driven by a motor 37 housed in the casing 35 through a gear link mechanism. The last gear of the gear link mechanism is linked to the drive shaft 36 through a worm wheel 38 and a worm 39 which are integrally formed with the drive shaft 36. The drive shaft 36 is provided with a link hole 40 which opens on a front end surface of the drive shaft, which hole is flat rectangular in cross section. The slide shaft part 31 of the aiming screw 28 threaded with the gear shaft 15 is fitted slidably but unrotatably in the link hole 40 formed in the drive shaft 36 of the leveling drive member 34.

With the automotive headlamp as described above, an initial aiming adjustment is operated as set forth hereinbelow.

A tip end part 42 of a Phillips driver 41 is inserted from the top to engage with the gear teeth 20 of the crown gear part 18 of the gear shaft 15. In this operation, the tip end part 42 of the Phillips driver 41 is guided by the driver guide walls 14, 14 integrally formed with the back wall 2 of the lamp housing 1 and led to between the driver supporting walls 13 and 13. The tip end part 42 of the driver 41 is positioned in the recess portion 12 formed on the top surface of the gear shaft supporting wall 10. The position of the driver 41 is restricted and stably held at a part slightly upper of the tip end part 42 thereof by the driver supporting walls 13, 13.

When the Phillips driver 41 rotates, the crown gear part 18 of the gear shaft 15 is urged to move frontward, and the resilient pieces 27, 27 . . . of the fastener 23 are deformed thereby to move the gear shaft 15 slightly frontward, so that the protrusions 21, 21 . . . of the crown gear part 18 disengage from the shallow slits 11 of the gear shaft supporting wall 10.

When the driver 41 rotates further, the tip end part 42 of the driver rotates the gear teeth 20, 20 . . . of the crown gear part 18, and hence the gear shaft 15 is rotated. When the gear shaft 15 is rotated, the aiming screw 28 slides back and forth corresponding to the rotational direction of the gear shaft 15 by rotating the threaded shaft part 29 engaging with the threaded hole 16 of the gear shaft 15, because the slide shaft part 31 of the aiming screw 28 is unrotatably fitted in the link hole 40 formed in the drive shaft 36 of the leveling drive member 34. According to the afore-mentioned operation, a gap defined by the headlamp unit 3 and the back wall 2 of the lamp housing 1 at the position of the gap adjusting member 7 is varied, and the headlamp unit 3 rotates around a line connecting between the rotational fulcrum part not shown and the other gap adjusting member, which line serves as a rotational axis. Thus, the aiming adjustment operation, that is, an adjustment of an illumination axis of the automotive headlamp is accomplished.

On the other hand, a leveling adjustment, that is, an adjustment for a displacement of the illumination axis caused by changing a load taken on the automobile and/or changing a position of the load is operated as described below.

The drive shaft 36 is rotated by driving the motor 37 of the leveling drive member 34 by a remote control, for example, a switch control from a driver's seat. A rotation of the drive shaft 36 causes the aiming screw 28 to rotate, the slide shaft part 31 of which is slidably but unrotatably fitted in the link hole 40. Then, since the protrusions 21, 21 . . . of the crown gear part 18 engage with the shallow slits 11 of the gear shaft supporting wall 10 to thereby prevent the gear shaft 15 from rotating, the aiming screw 28 is threaded into or out of the threaded hole 16 of the gear shaft 15 in accordance with the rotational direction of the crown gear part 18, so that the aiming screw 28 moves along an axial direction thereof. Accordingly, a gap defined by the headlamp unit 3 and the back wall 2 of the lamp housing 1 at the position of the gap adjusting member 7 is varied, and the headlamp unit 3 rotates around a line connecting between the rotational fulcrum part not shown and the other gap adjusting member, which line serves as a rotational axis. Thus, the leveling adjustment operation is accomplished.

In the automotive headlamp as described above, the aiming screw 28 rotatably linked to the headlamp unit 3 is prevented from rotating during the aiming adjustment operation by slidably fitting the non-circular slide shaft part 31 of the aiming screw 28 in the non-circular link hole 40 of the drive shaft 36 of the leveling drive member 34. Owing to this structure, during assembly, the slide shaft part 31 of the aiming screw 28 and the link hole 40 of the drive shaft 36 of the leveling drive member 34 can be fitted to each other while viewing both. Therefore, the workability during the assembly can be improved.

Further, since the aiming screw 28 is unrotatable with respect to the headlamp unit 3, when the aiming screw 28 is rotated, the aiming screw 28 moves in the axial direction thereof while being threaded into or out of the gear shaft 15 so that the headlamp unit 3 can be tilted. Therefore, both the initial aiming mechanism and the leveling mechanism can be readily assembled.

Figure 6:
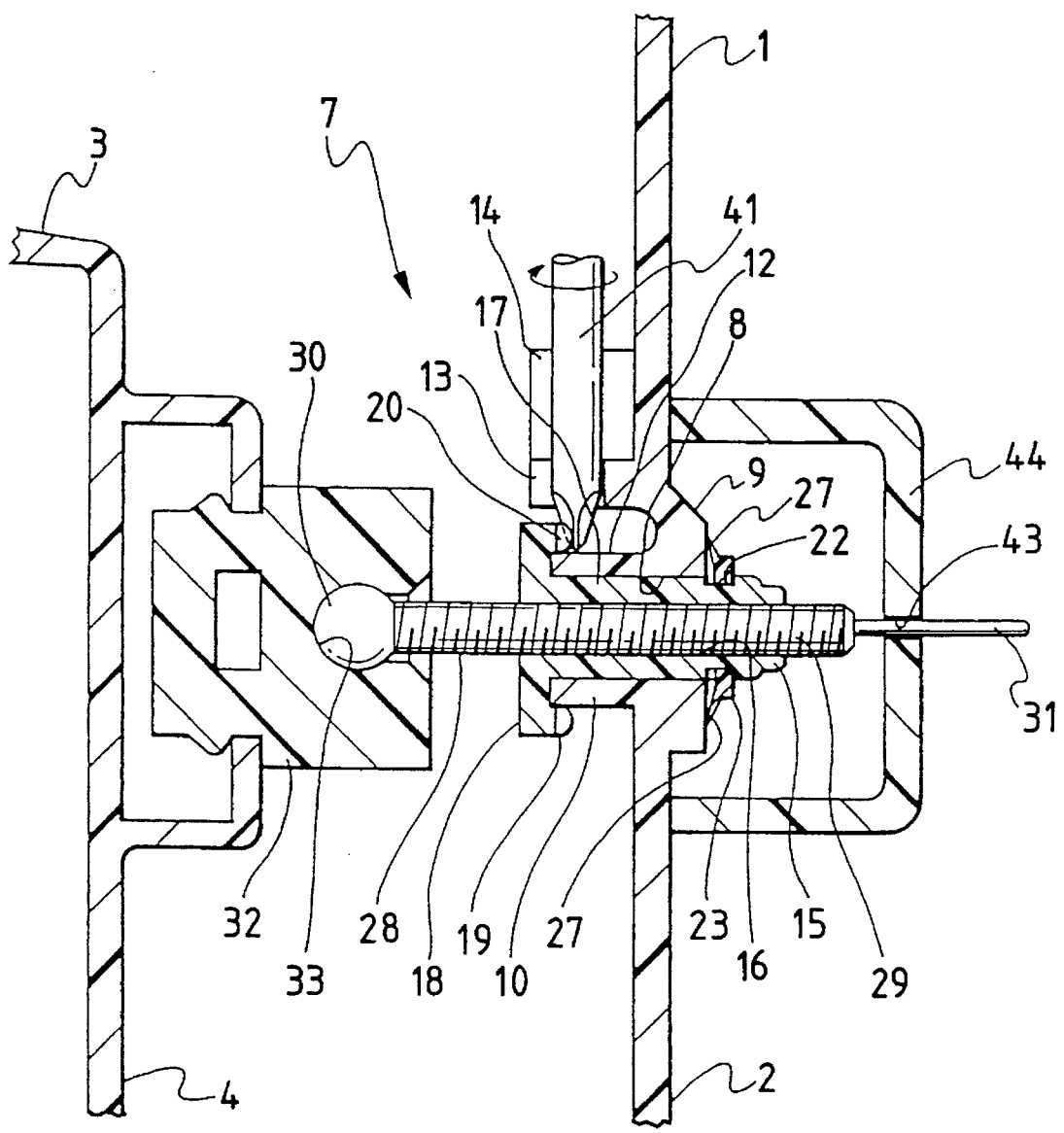
FIG. 6 is an enlarged sectional view showing an essential part of an automotive headlamp according to another arrangement of the present invention.

On the other hand, another gap adjusting member having no leveling mechanism can employ the same aiming screw 28. That is, as shown in FIG. 6, the lamp housing 1 is provided with a stopper 44 having a non-circular through hole 43 through which the slide shaft part 31 of the aiming screw 28 passes, and the slide shaft part 31 is slidably but unrotatably inserted in the through hole 43 of the stopper 44. With this structure, the aiming screw 28 is prevented from rotating, so that the aiming adjustment is operated by rotating the gear shaft 15 by a Phillips driver.

As described above, the automotive headlamp according to the present invention includes a gear apparatus having a cylindrical gear shaft supporting wall extending from an opening edge of a shaft insertion hole formed in a supporting wall of a lamp housing, the gear shaft supporting wall being formed on an edge surface thereof with slits or protrusions, a gear shaft having a gear part which is provided at a surface thereof facing the edge surface of the gear shaft supporting wall with projections or slits which engage with the slits or projections of the gear shaft supporting wall, the gear shaft further including engagement grooves formed on an outer peripheral surface of a portion in the vicinity of the other end thereof, and a fastener engaging with the engagement grooves for preventing the gear shaft from removing while inserted into the gear shaft supporting wall and the shaft insertion hole. The fastener is provided with resilient pieces extending outward from an outer peripheral edge thereof. The resilient pieces incline toward the supporting wall side and resiliently abut against the supporting wall. During an operation, the resilient pieces are deformed to thereby disengage the protrusions or slits of the gear shaft from the slits or protrusions of the gear shaft supporting wall.

According to the automotive headlamp of the present invention, while the gear shaft does not rotate, a resilient force directing to the end surface of the gear shaft supporting wall is applied to the protrusions or slits formed on the gear shaft by the resilient pieces formed on the fastener which resiliently abuts against the supporting wall, so that the protrusions or slits of the gear shaft engage with the slits or protrusions formed on the end surface of the gear shaft supporting wall thereby to suppress the rotation of the gear shaft. Therefore, the gear shaft is held on the gear shaft supporting wall which hardly rotates. In contrast, while the gear shaft rotates, the resilient pieces are provided to be deformed, and the protrusions or slits formed on the gear shaft can be moved in a direction opposed to the-end surface of the gear shaft supporting wall, so that the protrusions or slits of the gear shaft easily disengage from the slits or protrusions of the gear shaft supporting wall to thereby allow the gear shaft to rotate smoothly.

Owing to this structure, even if an external vibration, for example, is applied to the gear shaft or the like, the gear shaft would not tend to rotate, although the gear shaft can rotate easily when necessary.

In the foregoing embodiment, the diameter of the gear shaft is designed slightly larger than the inner diameter of the fastener. However, if the faster is to engage with the engagement groove of the gear shaft, the inner diameter of the fastener can be substantially enlarged thereby to easily engage with the gear shaft because of the radially extending slits formed on the inner peripheral surface of the fastener. When the gear shaft completely engages with the fastener, the enlarged inner diameter of the faster is restored to its original condition, and the stable engagement can be attained. Owing to this structure, good workability during assembly of the fastener to the gear shaft can be obtained.

Further, since the outward projecting pieces are provided on the outer peripheral surface of the fastener at positions corresponding to the portions of the fastener where the slits are formed, a sufficient distance or gap can be held between an outer end of the slits and an outer edge of the fastener. Therefore, a sufficient mechanical strength of the fastener can be maintained which prevents the fastener from being damaged or broken.

It should be understood that the structure of the invention shown and described herein is to be taken as preferred examples of the invention and that various changes in the shape, size and arrangement of parts may be resorted to without departing from the spirit of the invention or the scope of the appended claims.

What is claimed is:

1. An automotive headlamp, comprising:
   a lamp housing (1) having a supporting wall (2);
   a shaft insertion hole (8) formed in said supporting wall of said lamp housing; and
   a gear apparatus comprising:
      a cylindrical gear shaft supporting wall (10) extending from an opening edge of said shaft insertion hole of said lamp housing, said gear shaft supporting wall having an edge surface with a first set of one of slits and protrusions;
      a gear shaft (15) protruding through said cylindrical shaft supporting wall and said shaft insertion hole and comprising a gear part (18) at one end of said gear shaft, said gear part having gear teeth (20), said gear part having a surface facing the edge surface of said gear shaft supporting wall, said surface of said gear part being provided with a second set of one of protrusions and slits for engaging said first set of one of slits and protrusions of said gear shaft supporting wall, wherein an engagement groove (22) is formed on an outer peripheral surface of said gear shaft at an end of said gear shaft opposite said one end; and
      a fastener (23) engaged with said engagement groove for holding said gear shaft in said cylindrical gear shaft supporting wall and said shaft insertion hole, said fastener comprising resilient pieces (27) extending outward from an outer peripheral edge thereof, said resilient pieces protruding toward said supporting wall and resiliently abutting said supporting wall.

2. The automotive headlamp according to claim 1, wherein said second set of one of protrusions and slits is formed radially inwardly of said gear teeth of said gear shaft.

3. The automotive headlamp according to any one of claims 1 or 2, wherein said gear teeth of said gear part comprise crown gear teeth.

4. The automotive headlamp according to any one of claims 1 or 2, wherein said fastener comprises at least one slit (26) extending radially and opening to an inner peripheral surface of said fastener.

5. The automotive headlamp according to claim 4, wherein said fastener comprises at least one protruding piece (25) extending outward from an outer peripheral surface of said fastener at a position corresponding to a position where said at least one slit is formed.

6. An automotive headlamp, comprising:
   a stationary member secured to an automobile body;
   a movable member movably supported on the automotive body;
   a gear device slidably supported on said stationary member and engaged with said movable member, said gear device operatively moving said movable member with respect to said stationary member; and
   a substantially annular fastener member disposed between said stationary member and said gear device, said fastener member comprising a mounting hole through which said gear device is inserted, said fastener member being fitted to said gear device so as to allow said gear device to rotate, said fastener member comprising at least one resilient member for resiliently holding said gear device on said stationary member, said resilient member being deformed when a certain force is applied to said gear device, wherein said gear device comprises:
      a substantially cylindrical main shaft member having a threaded hole;
      a crown gear member projecting outward from said main shaft member;
      a screw member threadably inserted in the threaded hole of said main shaft member, said screw member comprising a slide shaft part at one end thereof and an engagement part engaging said movable member at an opposite end thereof, said slide shaft part being non-circular in cross section; and
      a groove formed on said main shaft member into which said fastener is fitted.

7. The automotive headlamp according to claim 6, wherein said stationary member comprises a back wall of a lamp housing.

8. The automotive headlamp according to claim 6, wherein said movable member comprises a lamp unit.

9. The automotive headlamp according to claim 6, wherein said stationary member comprises one of protrusions and slits and said crown gear member comprises one of slits and protrusions, and wherein said at least one resilient member biases said crown gear towards said stationary member so that said one of protrusions and slits are engaged with said one of slits and protrusions.

10. The automotive headlamp according to claim 6, wherein said gear device comprises an aiming device.

11. The automotive headlamp according to claim 6, wherein said fastener member comprises at least one projecting piece extending outwardly from an outer periphery of said fastener member, and at least one slit extending radially in an inner peripheral surface of said fastener member at a position corresponding to said at least one projecting piece.

12. The automotive headlamp according to claim 11, wherein and end of said slit is semicircular as viewed along an axial direction of said gear device.

13. The automotive headlamp according to claim 6, wherein said resilient member slightly inclines frontward at a tip end thereof.

14. The automotive headlamp according to claim 6, wherein said fastener is made of a synthetic resin.

15. The automotive headlamp according to claim 14, wherein said synthetic resin comprises nylon 66.

16. The automotive headlamp according to claim 6, wherein an outer diameter of said groove of said gear device is substantially equal to an inner diameter of said mounting hole of said fastener, and an outer diameter of said main shaft member is slightly larger than said inner diameter of said mounting hole of said fastener.

17. The automotive headlamp according to claim 11, wherein four projecting pieces and four corresponding slits are formed in said fastener member.

18. The automotive headlamp according to claim 6, wherein said crown gear comprises a gear forming edge which is adapted to receive a Phillips driver for rotating said main shaft member.

19. The automotive headlamp according to claim 6, wherein said main shaft member and said crown gear member are integrally formed.

\* \* \* \* \*